US008931153B1

(12) United States Patent
Kimminau

(10) Patent No.: US 8,931,153 B1
(45) Date of Patent: Jan. 13, 2015

(54) GARBAGE DISPOSAL TOOL

(76) Inventor: Kevin Kimminau, Lakewood, CA (US)

( * ) Notice: Subject to any disclaimer, the term of this patent is extended or adjusted under 35 U.S.C. 154(b) by 428 days.

(21) Appl. No.: 13/470,256

(22) Filed: May 11, 2012

Related U.S. Application Data

(60) Provisional application No. 61/484,882, filed on May 11, 2011.

(51) Int. Cl.
*B23P 19/04* (2006.01)

(52) U.S. Cl.
USPC .......... 29/256; 29/255

(58) Field of Classification Search
USPC ........ 29/255, 256, 270, 278, 261, 267; 269/3, 269/6, 95
See application file for complete search history.

(56) References Cited

U.S. PATENT DOCUMENTS

| | | | | |
|---|---|---|---|---|
| 3,594,890 | A * | 7/1971 | Cordell et al. | 29/255 |
| 5,251,368 | A * | 10/1993 | Somerville et al. | 29/255 |
| 6,609,283 | B1 * | 8/2003 | Somerville | 29/262 |
| 7,669,306 | B2 * | 3/2010 | Palka | 29/261 |
| 7,770,277 | B2 * | 8/2010 | Wridt | 29/261 |
| 8,079,123 | B2 * | 12/2011 | Lin | 29/259 |
| 2013/0042443 | A1 * | 2/2013 | Kawakami | 24/456 |

* cited by examiner

*Primary Examiner* — Lee D Wilson
(74) *Attorney, Agent, or Firm* — Kafantaris Law Offices; Theo Kafantaris

(57) ABSTRACT

The present invention will provide sturdy, adjustable support for installing a garbage disposal onto a kitchen sink. Furthermore, the present invention allows the disposal to be installed without the assistance of a second party. This is accomplished by uniquely clamping the garbage disposal to the underside of the sink, enabling the user to secure the device without the need to support it themselves.

6 Claims, 4 Drawing Sheets

GARBAGE DISPOSAL TOOL

CROSS-REFERENCE TO RELATED APPLICATIONS

This application claims the benefit of U.S. Provisional Patent Application No. 61/484,882, filed on May 11, 2011, and incorporated herein by reference.

STATEMENT REGARDING FEDERALLY SPONSORED RESEARCH AND DEVELOPMENT

Not Applicable.

FIELD OF THE INVENTION

This invention relates to installing utilities in a kitchen environment, and more particularly, to a tool that assists in installing a garbage disposal onto a kitchen sink.

DISCUSSION OF RELATED ART

A garbage disposal unit is an electrically powered device installed under a kitchen sink between the drain and the trap which shreds food waste into pieces small enough to pass through plumbing. This is accomplished by utilizing a high-torque motor which spins several shredders. A typical garbage disposal provides the user with an easy means of disposing food waste.

While installation of a garbage disposal to a sink is a difficult task when working as a single party, which is most often the case. The installer usually works in a very small and tight space under the sink, standing and installing sections above the sink and lying on his back to install sections below the sink.

The first procedure in the installation is mounting the sink flange, which rests on top of the sink. From beneath the sink, the mounting hardware and snap ring will be attached. A common problem that the installer encounters is that downward pressure must be applied on the sink flange in order to install the snap ring. If the installer does not have an assistant, he must hold the sink flange with one hand to apply pressure while at the same time applying the snap ring and manipulating the mounting hardware with the other. This presents obvious problems and difficulties when installing the sink flange and mounting hardware without assistance.

The second procedure in the installation of the garbage disposal is installing the disposer motor assembly to the flange mounting ring. The installer must lift the garbage disposal motor assembly (typically weighing 12-20 lbs) with one hand while securing the mounting ring to the sink flange mounting ring with the other. This can be dangerous and difficult because the installer is lifting in an awkward position while attempting to secure the mounting ring with the other hand.

While garbage disposals can easily be installed by two individuals, it is not always convenient to find a second party to assist in the installation process. Therefore, a need exists for a tool which enables a single individual to install a garbage disposal without straining themselves or using other inefficient tools.

SUMMARY OF THE INVENTION

The present invention will provide sturdy, adjustable support for installing a garbage disposal onto a kitchen sink. Furthermore, the present invention allows the disposal to be installed without the assistance of a second party. This is accomplished by uniquely clamping the garbage disposal to the underside of the sink, enabling the user to secure the device without the need to support it themselves.

The present invention comprises a sink plug with a locking mechanism attached to a hollow adjustable shaft and separable legs. The device will snap into the garbage disposal sink flange where the sink plug would normally go, creating a very tight fit. The shaft will consequently be placed through the sink flange and drain, and finally through the flange hardware open end of the garbage disposal. A knob will be used to open the legs, which open and retain the internal section of the garbage disposal. The elongated shaft will then be pulled upward about one inch, ratcheting freely in the upward direction but preventing movement in the downward direction. The weight of the garbage disposal will then apply pressure to the sink flange, allowing the installer to easily install the hardware and snap ring using both hands without lying down or using an assistant.

After the installation of the sink flange and hardware, the elongated shaft is then pulled upward until it is seated against the sink flange and mounting ring. The ratcheting means will again prevent movement in the downward direction. The installer will then use both hands to lock the garbage disposal to the sink flange mounting ring. When in these positions, installation of the garbage disposal is extremely safe and easy, and does not require an assistant or other supporting means.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The present invention comprises a hollow elongated shaft 20 that, when positioned inside a sink drain, will provide its user a fully adjustable device to clamp a garbage disposal to the under section of the sink. The shaft 20 comprises a lightweight, sturdy, ½-1 inch rounded or squared tubing. Aluminum is the preferred material, although rigid plastic, steel, or other suitable material can be used. The sink plug 27 is made of rubber or other flexible material which will allow it to securely fasten itself to the drain of a kitchen sink. The present invention will retain the garbage disposal in an installed position, allowing the user to install the device without the need of an additional party.

Figure 1:
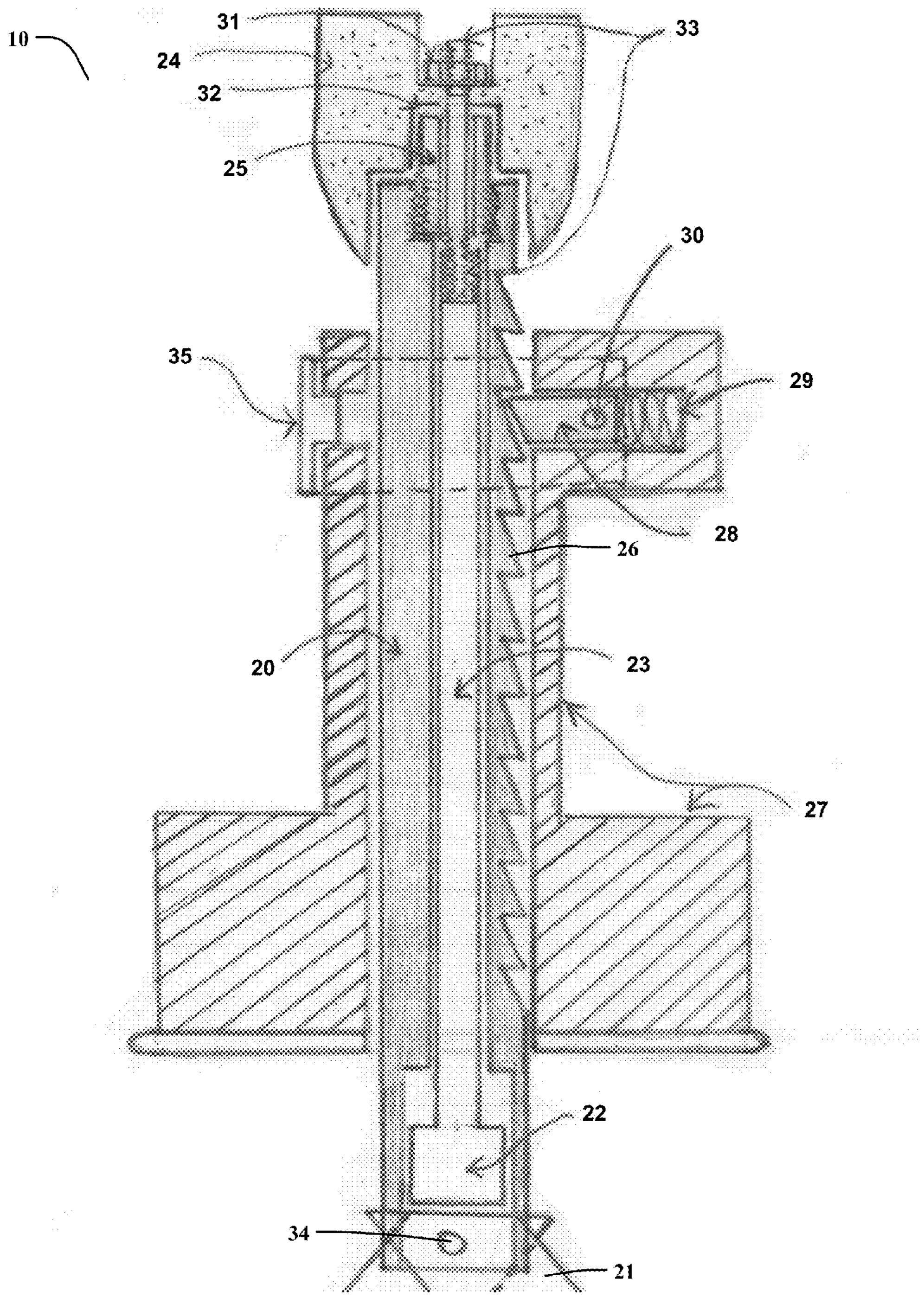
FIG. 1 is a front cross-sectional view of the invention.
Figure 2:
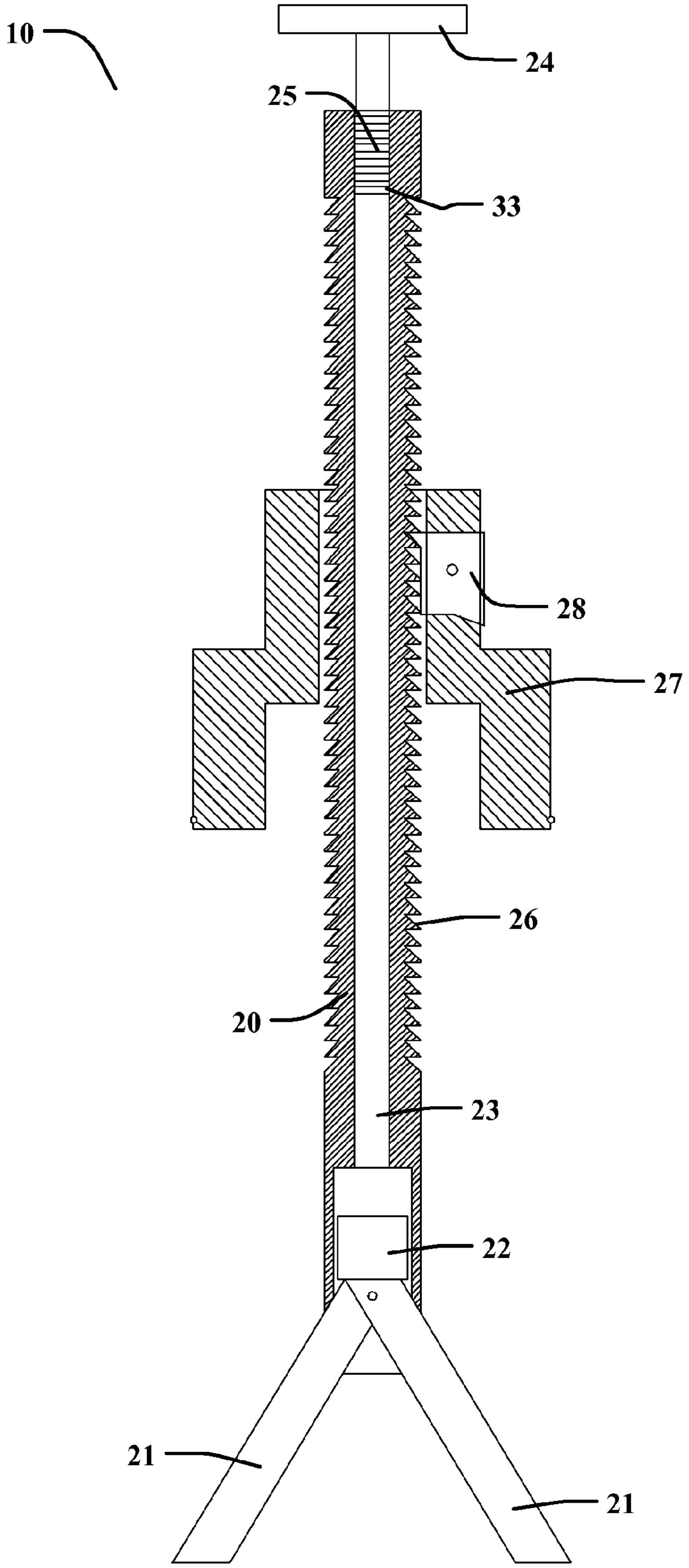
FIG. 2 is a front cross sectional view of an alternative embodiment of the invention.
Figure 3:
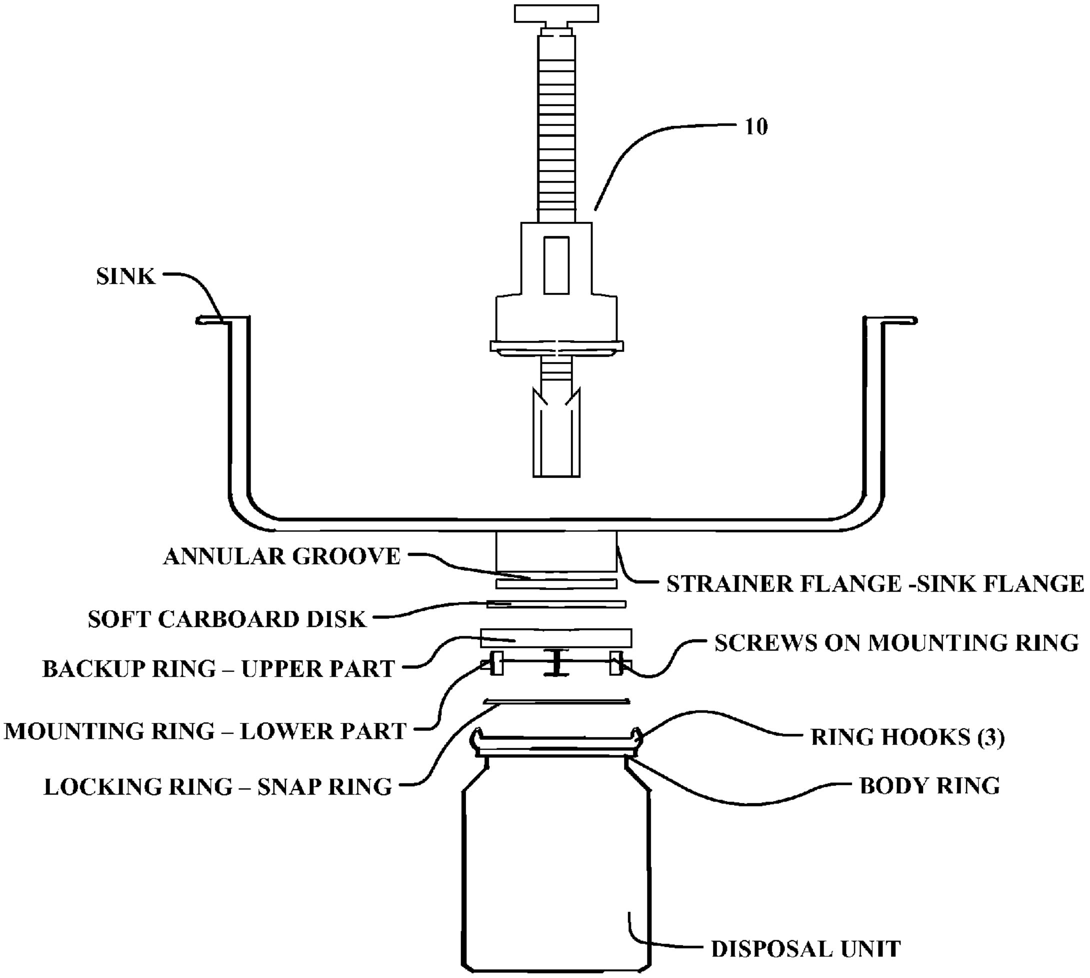
FIG. 3 is a front view of the invention during use.
Figure 4:
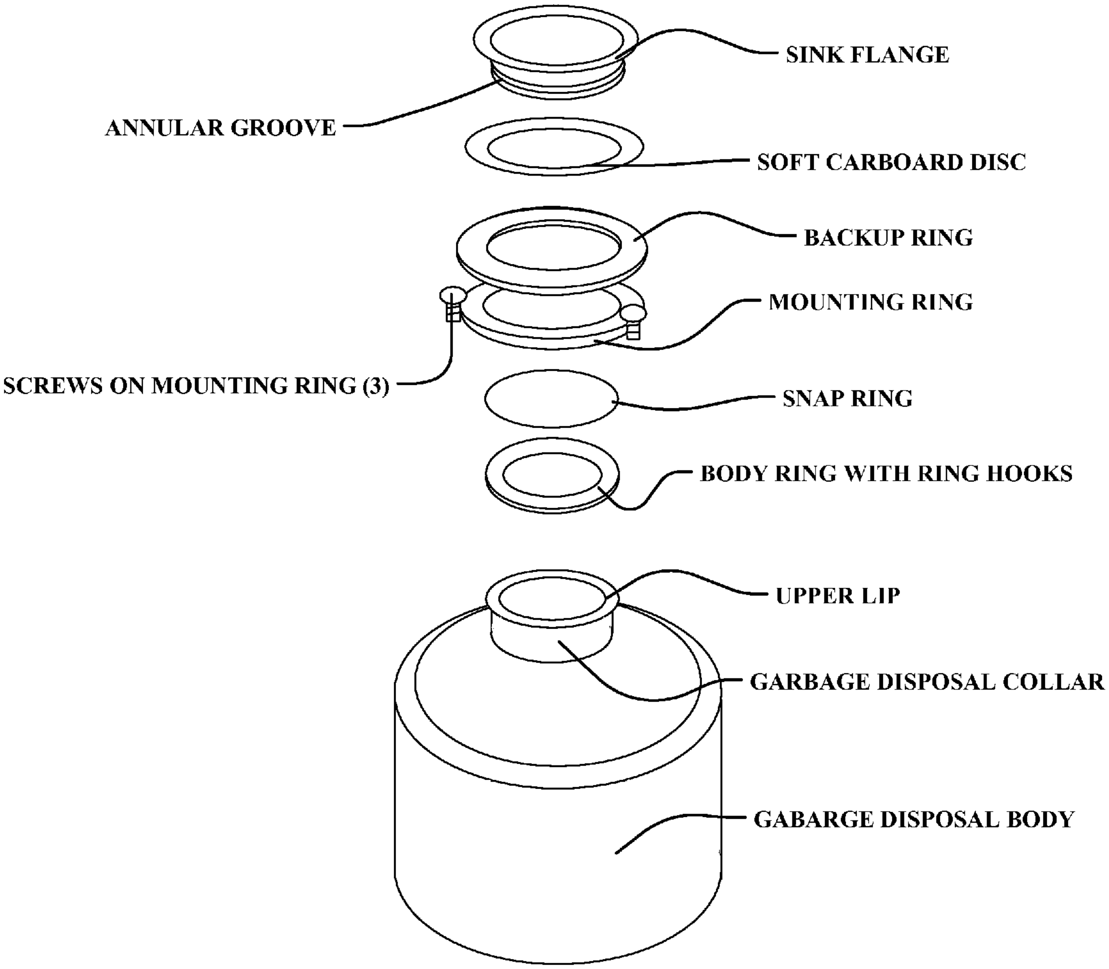
FIG. 4 is a front prospective view of the arrangement of items for installation of a garbage disposal.

The shaft 20 of the garbage disposal tool 10 comprises a proximal and distal end. The distal end comprises two legs 21 which attach with a bolt 34. The lower ends of the legs 21 are rectangular, while the upper ends are triangular. The legs 21 are orientated so that the flat end of the triangle point inwardly, while the angled edge point outwardly (see FIG. 1). This orientation allows the legs 21 to open when a square stock 22 applies a downward force onto them. In a fully open position, the angled edges will rest horizontally, held in place by the square stock 22, and the legs 21 will open at approximately 45 degree angles.

The square stock 22 is attached to the distal end of a push rod 23, which is enclosed within the shaft 20. The distal end of the push rod 23 and shaft 20 comprise threaded sections 33 with an attached handle or knob 24. A square cutout 32 inside of the knob 24 houses the mechanism which allows the knob to move the square stock 22 vertically. In the preferred embodiment, this is a threaded section, although any adjustment means can be used. The knob 24 will rotate a threaded screw 25, which is attached to the push rod 23 and retained by a nut 31. Rotating the knob 24 will move the square stock 22 vertically, allowing the user to open and close the legs 21 as desired. In an alternative embodiment, no square stock 22 is used, and the push rod 23 connects directly to the legs 21.

The shaft 20 comprises several downward-facing teeth 26 on one end of the shaft 20. The shaft 20 further comprises a sink plug 27 which can travel vertically along the shaft 20. The sink plug 27 comprises a locking mechanism 28 and spring 29, along with a pin 30 that retains them both. The locking mechanism 28 and teeth 26 only allow movement of the shaft 20 in the upward direction, and prevent movement in the downward direction unless released. As such, the shaft 20 and legs 21 can ratchet upward to a desired position, but are prevented from moving downward. A push bar 35 is used to release the locking mechanism 28, allowing movement in the downward direction when desired.

When installing a garbage disposal, the sink plug 27 and square stock 22 will be placed in the topmost position. In this orientation, the legs 21 will dangle freely, as no force is applied onto them. The proximal end will be placed through the drain of a kitchen sink, and the sink plug 27 will snap into the garbage disposal sink flange where the sink drain plug would normally go, creating a very tight fit. The proximal end will then be fed through the opening of the garbage disposal, which would be resting underneath the sink. While the legs 21 are inside of the garbage disposal, the user will rotate the knob 24, which rotates the threaded screw 25 and push rod 23. The rotation will move the push rod 23, and consequently the square stock 22, downward.

The force applied by the square stock 22 will open the legs 21, and once fully open, will allow the garbage disposal to rest on them without falling. The user will then ratchet the shaft 20 upward approximately one inch so the garbage disposal no longer rests on the ground. The teeth 26 will allow the shaft to ratchet upward freely, but the teeth 26 and locking mechanism 28 will prevent it from moving downward. The resulting downward force will apply pressure to the sink flange, allowing the installer to easily install the hardware and snap ring with both hands without lying down or requesting assistance.

After the installation of the sink flange, the shaft 20 is again pulled upward until the garbage disposal is seated against the sink flange and mounting ring. The downward force will again assist the installer to easily lock the garbage disposal to the sink flange mounting ring. After installation, the user will depress the push bar 29 to release the tool 10 from the sink and garbage disposal.

While the above description contains specific details regarding certain elements, sizes, and other teachings, it is understood that embodiments of the invention or any combination of them may be practiced without these specific details. Specifically, although colors are designated in the above embodiments, any color may be used. These details should not be construed as limitations on the scope of any embodiment, but merely as exemplifications of the presently preferred embodiments. In other instances, well known structures, elements, and techniques have not been shown to clearly explain the details of the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A garbage disposal tool comprising:

a sink plug adapted to fit securely within a standard sink drain, said sink plug having a shaft aperture and a locking mechanism;

a elongated shaft having a proximal and distal end, said elongated shaft adapted to adjustably attach to said sink plug within said shaft aperture, said elongated shaft having a push rod aperture;

a push rod having a proximal and distal end, said push rod adapted to adjustably attach to said elongated shaft within said push rod aperture;

a handle fixedly attached to said proximal end of said push rod;

a stock fixedly attached to said distal end of said push rod; and a pair of legs pivotally attached to said distal end of said elongated shaft, said pair of legs positioned adjacent to said stock such that a downward force applied by said stock will open said legs;

wherein a garbage disposal can be installed by securing said sink plug within said sink drain, inserting said elongated shaft within said sink plug, inserting said legs into said garbage disposal, adjusting said handle such that said push rod will apply force to said stock and open said legs within said garbage disposal, and adjusting said elongated shaft within said sink plug such that said garbage disposal is raised beneath said sink drain.

2. The garbage disposal tool of claim 1, wherein said sink plug further comprises an O-Ring adapted to fit securely between said sink plug and said sink drain.

3. The garbage disposal tool of claim 1, wherein said proximal end of said push rod and elongated shaft are threaded and said push rod is adjustable by turning said push rod about said threads of said elongated shaft.

4. The garbage disposal tool of claim 1, wherein said elongated shaft further comprises a plurality of downward-facing teeth, and wherein said locking mechanism is adapted to permit upward movement and prevent downward movement without releasing said locking mechanism.

5. The garbage disposal tool of claim 4, wherein said locking mechanism comprises a spring and pivots about a lock pin.

6. A garbage disposal tool comprising:

a sink plug adapted to fit securely within a standard sink drain, said sink plug having a shaft aperture and a locking mechanism;

a elongated shaft having a proximal and distal end, said elongated shaft adapted to adjustably attach to said sink plug within said shaft aperture, said elongated shaft having a push rod aperture;

a push rod having a proximal and distal end, said push rod adapted to adjustably attach to said elongated shaft within said push rod aperture;

a handle fixedly attached to said proximal end of said push rod; and a pair of legs pivotally attached to said distal end of said elongated shaft, said pair of legs positioned adjacent to said push rod such that a downward force applied by said push rod will open said legs;

wherein a garbage disposal can be installed by securing said sink plug within said sink drain, inserting said elongated shaft within said sink plug, inserting said legs into said garbage disposal, adjusting said handle such that said push rod will open said legs within said garbage disposal, and adjusting said elongated shaft within said sink plug such that said garbage disposal is raised beneath said sink drain.

* * * * *